United States Patent
Nelson

[15] 3,640,299
[45] Feb. 8, 1972

[54] SUBSEA WELLHEAD CONTROL SYSTEM

[72] Inventor: Norman A. Nelson, Houston, Tex.
[73] Assignee: ACF Industries, Incorporated, New York, N.Y.
[22] Filed: Oct. 6, 1969
[21] Appl. No.: 866,789

[52] U.S. Cl. ...................................137/1, 166/.5, 166/85, 285/131, 285/306, 138/97, 254/134.4, 137/595
[51] Int. Cl. .......................................................F16k 11/10
[58] Field of Search ...................15/104.06, 315; 137/595, 1, 137/236, 594; 254/134.4, 134.3; 285/131, 132, 306, DIG. 21; 138/97; 166/.5, .6, 85, 97, 250

[56] References Cited

UNITED STATES PATENTS

| | | | |
|---|---|---|---|
| 2,953,806 | 9/1960 | Walker | 15/315 |
| 2,990,851 | 7/1961 | Jackson et al. | 137/595 |
| 3,217,725 | 11/1965 | Varian | 137/1 |
| 3,321,184 | 5/1967 | Goss | 254/134.4 |
| 3,022,822 | 2/1962 | McStravick et al. | 166/250 |

*Primary Examiner*—Henry T. Klinksiek
*Attorney*—James L. Jackson

[57] ABSTRACT

The invention concerns a fluid energized control system for controlling the valves of subsea wellheads and for controlling other like mechanical devices designed for fluid actuation. A single protective conduit is connected at one extremity thereof to a control facility while its other extremity terminates in connection structure located adjacent or attached to a remotely located wellhead or other mechanical device. Suitable actuator control conduits extend from a plurality of fluid-controlled wellhead valve actuators and are connected in fluid communication to the connection structure. The terminal connection structure is provided with internal fluid passages communicating with respective ones of the actuator conduits and defines a pig-receiving recess. A locomotive pig is inserted into the protective conduit at the control facility and is moved within the protective conduit by fluid pressure applied from a suitable source of pressurized fluid or by a combination of fluid pressure applied at one side of the pig and a suction applied to the other side of the pig. A plurality of valve control conduits are connected to the pig in fluid communication with corresponding fluid passages formed in pig structure. The control conduits are pulled through the protective conduits by the pig as fluid pressure is applied. As the pig enters the pig-receiving recess, it is oriented, if necessary, by appropriate orienting structure and is locked into assembly within the recess with appropriate fluid passage structure of the pig disposed in fluid communication with corresponding fluid passages in the terminal connection structure. A plurality of pilot valves, provided within or adjacent the pig or terminal connection structure, are controlled by application of fluid pressure through the control conduits and serve to control communication of pressurized actuating fluid, carried in the protective conduit externally of the control conduits, to the actuating conduits of the subsea wellhead. The valve actuators are energized by the actuating fluid responsive to actuation of the pilot valves. An accumulator and pressure-balancing circuit are communicated to the fluid circuitry of each of the valve actuators in order to allow quick energized and deenergized actuation of the valve actuators. Fluid pressure is transferred from the accumulator and pressure-balancing circuitry to the actuator fluid supply of the fluid system upon reduction of pressure in the actuator fluid supply and such transfer may be aided by the hydrostatic head of the sea water in which the system is submerged.

13 Claims, 14 Drawing Figures

Norman A. Nelson
INVENTOR

BY *James Jackson*

ATTORNEY

FIG. 4

Norman A. Nelson
INVENTOR

BY James Jackson
ATTORNEY

Norman A. Nelson
INVENTOR

BY *James Jackson*

ATTORNEY

Norman A. Nelson
INVENTOR

SUBSEA WELLHEAD CONTROL SYSTEM

BACKGROUND OF THE INVENTION

This invention relates generally to subsea petroleum wells and more particularly to a control system for selectively controlling energization of a plurality of wellhead valve actuators of a remotely located wellhead. Offshore wells are drilled into the ocean floor and may be completed either by placing a wellhead assembly on or adjacent the ocean floor or by placing the wellhead assembly on a platform elevated above the surface of the ocean. Where the wellhead installation is remotely located with respect to a control facility, regardless whether a subsea or above surface wellhead installation is concerned, it is necessary to extend control conduits from the control facility to the wellhead structure in order to achieve automatic or selective operation of the various valve actuators of the wellhead. Due to the adverse conditions under which the control cables must function, it is necessary that each control line have considerable strength in order to withstand damage and to facilitate handling by vessels laying the control lines. Control lines of this nature are obviously extremely expensive tending to adversely affect the commercial feasibility of a control system of this nature. Moreover, the repair of such control lines is often expensive and represents another factor tending to adversely affect feasibility of the control system.

Where hydraulic connecting devices are located in a subsea environment and repair is required, it is obviously an extremely expensive and hazardous operation to accomplish the repair operation underwater. Marine life and accelerated corrosion also represent a deterrent to efficient repair of submerged hydraulic connection structure.

SUMMARY OF THE INVENTION

It is, therefore, a primary object of my invention to provide a fluid-energized control system for actuating the valves of subsea wellheads and other like mechanical devices through utilization of a single protective conduit which serves to protect a plurality of control conduits provided for the various valve actuators or mechanical devices.

It is a further object of my invention to provide a novel fluid-energized control system utilizing a single protective conduit that serves to provide a source of pressurized fluid for actuating a plurality of fluid-energized wellhead valves or mechanical devices.

Among the several objects of my invention is contemplated the provision of a novel fluid-energized control system incorporating a locomotive pig for transporting a plurality of control conduits to the vicinity of the wellhead or mechanical device and which is received by suitable connection apparatus cooperating with the pig structure to establish fluid communication between the control conduits and suitable fluid structure of the wellhead valve apparatus or other mechanical device.

It is an even further object of my invention to provide a novel fluid-energized control system including a single protective conduit suitable of receiving a locomotive pig and a plurality of conduits therein in such manner that control of various fluid energized wellhead valves on mechanical devices are achieved through the control conduits while pressure actuation of the wellhead valves on mechanical devices is achieved by fluid pressure carried within the protective conduit exteriorly of the control conduits.

It is another important object of my invention to provide a novel fluid-energized control system for remotely located wellhead valves or other like mechanical devices utilizing a single protective conduit having a locomotive pig disposed therein and including a controllable locking structure for latching the locomotive pig in inmovable assembly with terminal connection structure located adjacent the wellhead valves or mechanical devices to be actuated.

It is an even further object of my invention to provide a novel fluid-energized control system incorporating appropriate accumulator circuitry that is operative to allow quick closure or quick deenergized actuation of remotely located wellhead valves and which is capable of introducing fluid expelled from wellhead valve actuators back into the actuator fluid supply system upon a decrease in pressure of the fluid therein.

It is an even further object of my invention to provide a method of installing a fluid-energized control system for remotely located valve actuators or mechanical devices.

Other and further objects, advantages and features of this invention will become apparent to one skilled in the art upon consideration of the written specification, the attached claims and the annexed drawings. The form of the invention which will now be described in detail illustrates the general principles of the invention, but it is to be understood that this detailed description is not to be taken as limiting, since the scope of the invention is thus defined by the appended claims. Such description will be referred to by reference characters in the drawings in which:

Figure 1:
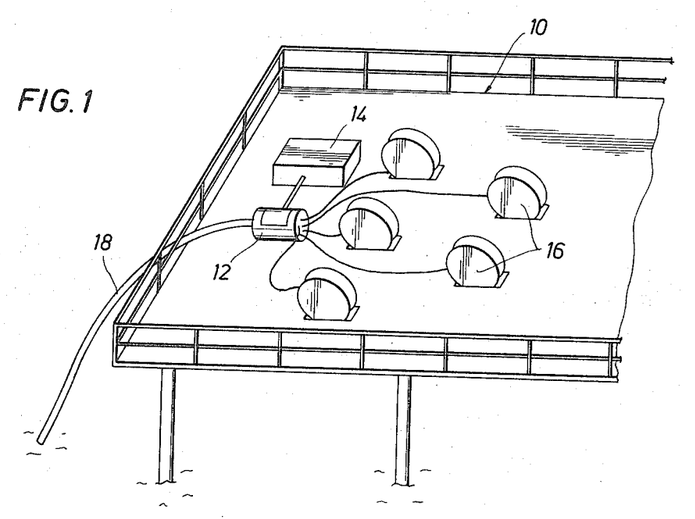
FIG. 1 is an isometric view illustrating a platform from which remotely located wellhead valves or mechanical devices are to be controlled and showing installation of the control conduits within the single protective conduit structure.

Referring now to the drawings for a better understanding of this invention, in FIG. 1 is illustrated a platform structure 10 that is elevated above the surface of the ocean. A pig insertion housing 12 is supported on the platform 10 and is disposed in fluid communication with a source 14 of pressurized fluid such as hydraulic fluid or pneumatic fluid. A plurality of control conduit supply drums 16 are also supported on the platform 10 in such manner as to allow the flexible conduit contained therein to be extended into the pig insertion housing 12. The manner of insertion of the flexible conduit into the pig insertion housing will be described in greater detail hereinbelow.

Figures 2, 6:
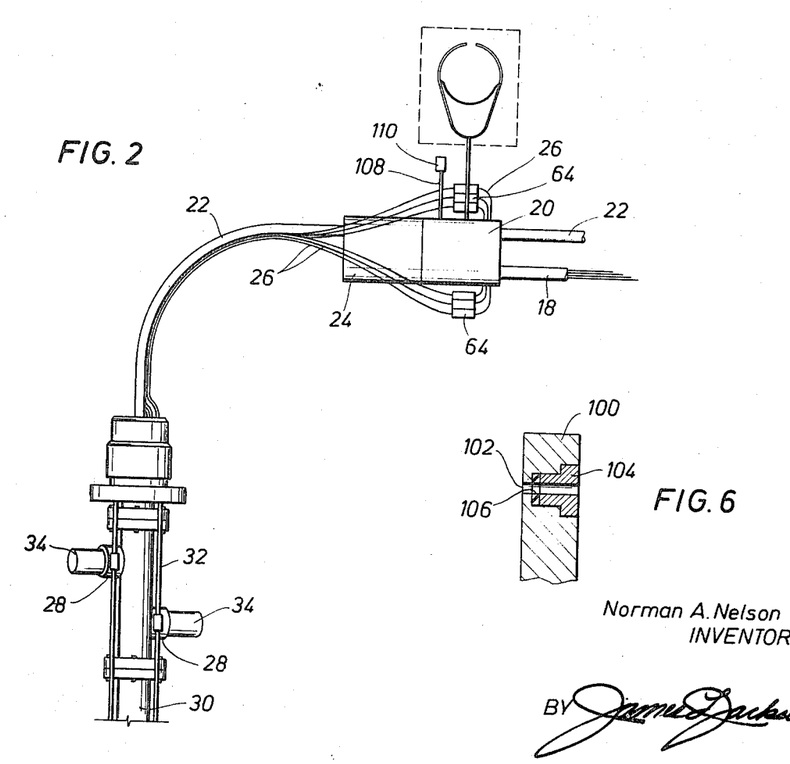
FIG. 2 is an elevational view partially illustrating a wellhead structure and showing flow line and control line connection structure therefor.
FIG. 6 is a fragmentary sectional view of the orifice plate structure of FIG. 5 in detail.

A single protective conduit 18 is connected at one extremity thereof to the pig insertion housing 12 and extends into the ocean and along the ocean floor to a distant connection structure 20 located adjacent a subsea wellhead structure or other mechanical device as illustrated in FIG. 2. As illustrated in FIG. 2, the connection structure 20 may be incorporated with connection structure for a flow line 22 provided for conducting produced petroleum fluid from the subsea well installation, or the hydraulic or pneumatic connection structure may be a separate connection within the scope of this invention. The connection structure 20 is received by a mating connection structure 24 that is in turn connected with the flow line structure 22 of the wellhead. A plurality of control conduits 26 extend from the terminal connector 20 and are connected to the hydraulic actuation circuitry of the wellhead for controlled actuation of selected ones of the wellhead valves 28 of the wellhead 30. Fluid flowing through the connection structures 20 and 24 from the protective conduit 18 will enter the wellhead control circuitry through the control conduits 26. This fluid will then be distributed to the various valve structures 28 by distribution conduits 32 for energization of the various valve actuators 34 associated with each of the wellhead valves 28. For so much of the structure of the various valve actuators and control system of the wellhead as is necessary to an understanding of the instant invention, reference may be had to U.S. Pat. No. 3,466,001, issued Sept. 9, 1969.

Figure 3:
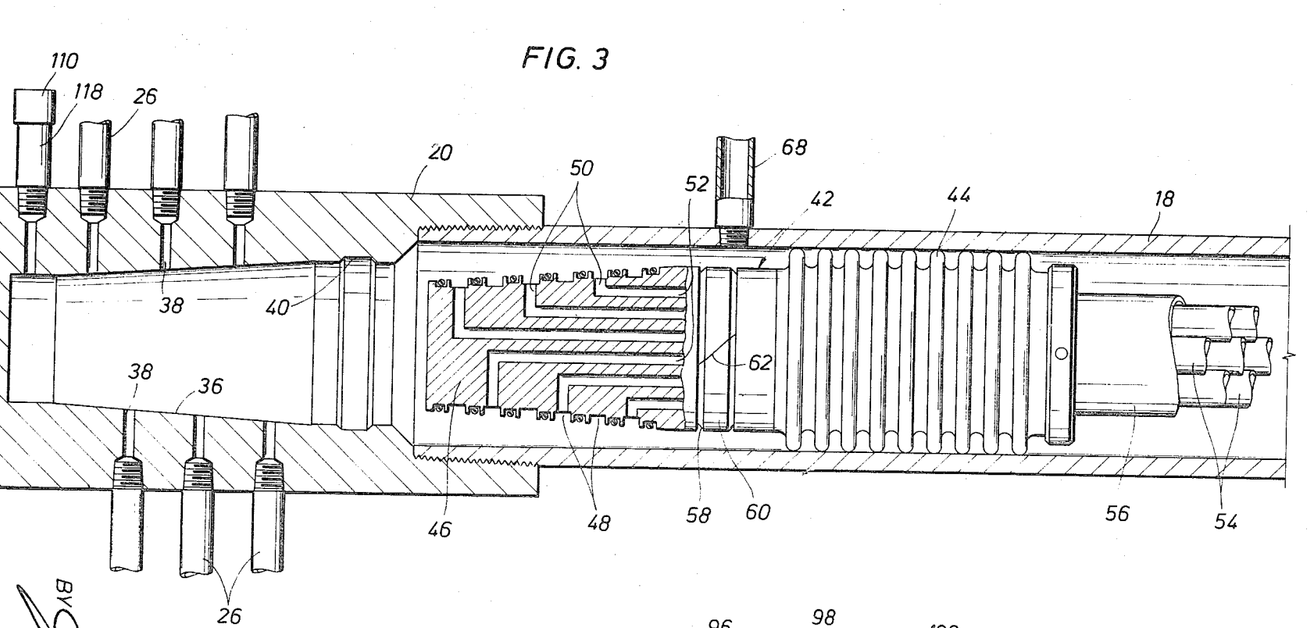
FIG. 3 is a fragmentary sectional view illustrating a single protective conduit according to this invention and fluid system connection provided therefore and showing a locomotive pig within the protective conduit structure, as the pig appears before reaching its fully extended position.
Figure 4:
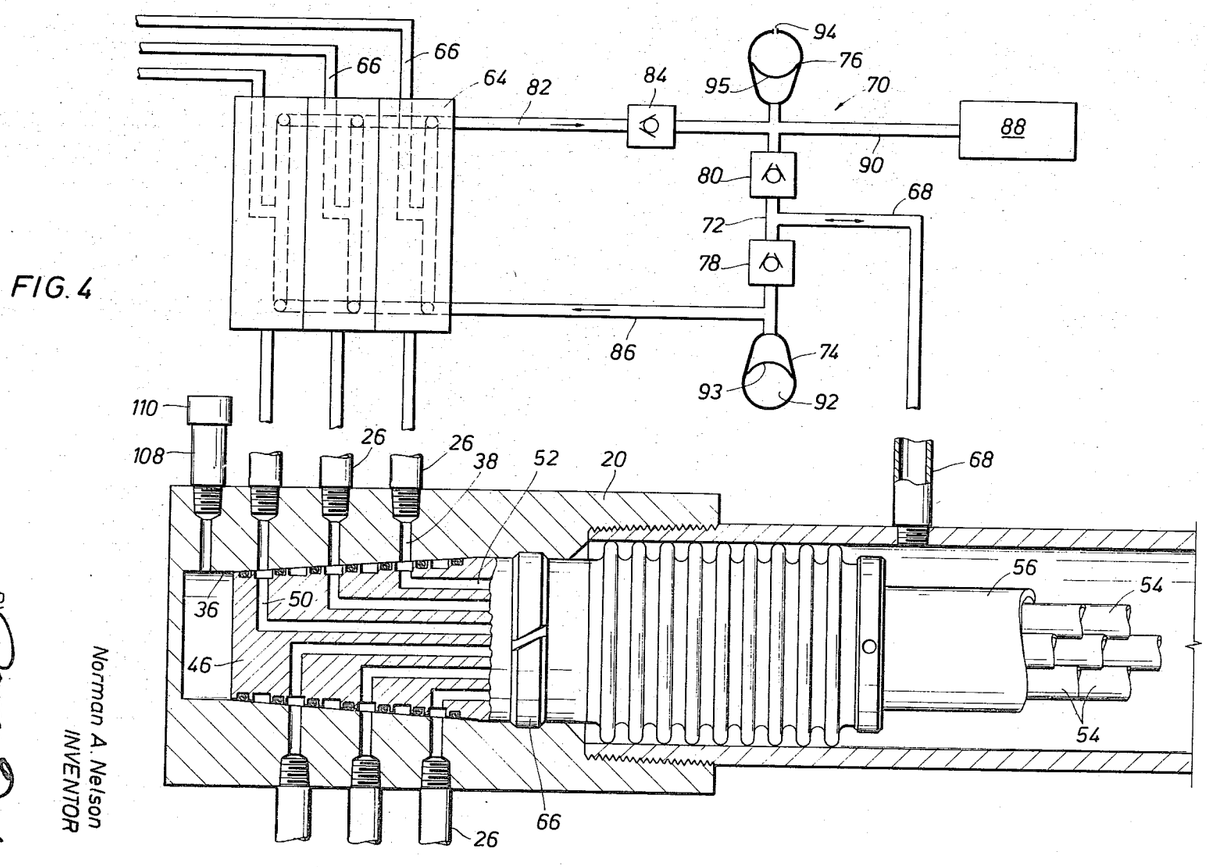
FIG. 4 is a fragmentary sectional view of the protective conduit and hydraulic connection structure of FIG. 3 and illustrating the locomotive pig in fully assembled and locked condition within the hydraulic terminal connection structure and schematically illustrating a fluid accumulator and pressure balancing system that may be incorporated into either embodiment of my invention.

With reference now to FIGS. 3 and 4, the protective conduit 18 is illustrated as being threaded at one extremity thereof and being threadedly received by the terminal connector 20. The terminal connector 20 is provided with an internal plug receiving recess 36 shown to be of frustoconical configuration. The control conduits 26 are threadedly connected to the terminal connector 20 and are maintained in fluid communication with the plug-receiving recess 36 by transverse fluid transfer passages 38. An annular latching or locking recess 40 is also formed internally of the plug-receiving recess 36.

A locomotive pig, illustrated generally at 42, is disposed within the protective conduit 18 and is maintained in sealed relation with the inner wall of the protective conduit by an elongated dynamic sealing member 44, generally referred to as a "swab." The pig member 42 is provided with a tapered nose portion 46 formed to mate closely with the plug-receiving recess 36 of the terminal connector 20. The nose portion 46 is provided with a plurality of circumferential grooves 48 that communicate with transverse passages 50 in order to provide fluid communication between the grooves 48 and a plurality of internal control passages 52 formed within the pig structure that are in turn disposed in fluid communication with respective ones of a plurality of control conduits 54 extending from the pig structure. As shown in FIGS. 3 and 4, the control conduits 54 may be encased in a protective sleeve 56 or the control conduits may be inserted loosely into the protective conduit 18 as desired.

The pig structure is formed with a recess 58 in which is disposed a spring sleeve-type connector latch 60 and the connector latch 60 is split as shown in 62 and is expandable between a collapsed position illustrated in FIG. 3 and an expanded or latched position illustrated in FIG. 4. Upon movement of the pig 46 into the recess 36 sufficiently to dispose the latch member 60 in registry with the latching recess 40, fluid pressure from a latching control conduit 61 will cause the connector latch 60 to expand into its latched or FIG. 4 position in the manner illustrated in FIGS. 4 and 8. If desired, the latch structure may be provided in the terminal connector 20 and appropriate latch recess structure may be provided in the locomotive pig within the scope of the instant invention.

As illustrated in FIG. 4, each of the control conduits 26 communicates with an associated pilot valve 64 having fluid circuitry communicating with an actuator conduit 66. The actuator conduit 66 extends from the pilot valve structures to the fluid circuitry of an associated one of the wellhead valve actuators shown at 34 in FIG. 2. The pilot valves 64 are controlled by changes of fluid pressure within the control conduits 54 in order to selectively control the flow of actuating fluid from the protective conduit 18 through the actuator conduits 54.

For the purpose of supplying actuating fluid pressure to and from the remotely located valve actuators 34, the space within the protective conduit 18 exteriorly of the casing 56 or exteriorly of the control conduits serves to conduct actuating fluid. An actuating fluid supply conduit 68 is threadedly connected to the protective conduit 18 and supplies pressurized hydraulic or pneumatic fluid through an accumulator and pressure-balancing circuit illustrated generally at 70 to the pilot valve structure 64. The accumulator and pressure-balancing circuit 70 includes a fluid transfer conduit 72 interconnecting an accumulator 74 and a pressure-balancing chamber 76. Check valves 78 and 80 are provided in the fluid transfer conduit 72 in such manner as to allow the flow of actuating fluid from the conduit 68 to the accumulator 74, but prevents the flow of actuating fluid from the conduit 68 to the pressure-balancing chamber 76. Actuating fluid from the accumulator 74 is communicated to the pilot valve 64 through a conduit 86 under control of a check valve 78 that is so arranged as to prevent the flow of fluid from the pilot valve to the pressure-balancing chamber 76. An actuator fluid return conduit 82 is connected at one extremity thereof to the pilot valve structure 64 and is connected at its other extremity to the accumulator and pressure-balancing circuit above a check valve 80 provided to permit the flow of fluid only from the conduit 82 or from the pressure-balancing chamber 76 to the conduit 68. The conduit 82 is provided with a check valve 84 allowing the flow of fluid only from the pilot valves 64 to the accumulator and pressure-balancing circuit.

For the purpose of relieving fluid pressure in the event excessively high pressures should occur within the accumulator and pressure-blanacing circuit 70, a relief valve structure 88 is disposed in fluid communication with the pressure-balancing chamber 76 through a relief conduit 90. In the event excessive fluid pressures occur within the system, the relief valve 88 will open, thereby venting pressurized fluid into the medium surrounding the system.

As indicated above, pressurized fluid for actuation of the remotely located wellhead valve actuators is supplied in the space within the protective conduit 18 exteriorly of the protective covering 56 of the control conduits 54 or exteriorly of the loose control conduits 54. Fluid pressure from the protective conduit 18 is transmitted through the accumulator and pressure-balancing system 70 through the fluid supply conduit 68. The upper check valve 80 prevents the flow of pressurized fluid to the pressure-balancing chamber 76 while the lower check valve 78 permits the flow of actuator fluid through the conduit 72 to the accumulator 74, thereby compressing the gaseous medium contained in the chamber 92 of the accumulator through movement of the flexible diaphragm 93. The pressurized actuator fluid is conducted to the pilot valves 64 by the actuation conduit 86 and is introduced into selective ones of the actuator conduits 66 by the control valves. As described above, the control valves 64 are energized by fluid conducted to the control valves through the control conduits 54, through the pig fluid passages 50 and 52 and through appropriate ones of the terminal connector passages 38 to the control conduit 26. Pressurized fluid stored in the lower accumulator 74 will assist fluid supplied through the conduit 68 in order to achieve rapid actuation of the remotely located valve actuators especially when a plurality of actuators are simultaneously controlled and a substantial volume of fluid is required. Upon reversal of the pilot valves 64, fluid is allowed to flow from the actuators through the conduits 66 to the control valves and enters the return conduit 82. Since the fluid pressure within the protective conduit 18 may be at a higher level than the pressure within the return line 82, it may be impossible to immediately return the actuating fluid directly into the protective conduit. Under this condition, fluid within the return conduit 82 will displace the check valve 84 and will flow into the pressure-balancing chamber 76 causing displacement of the medium therein through an opening 94 by the flexible diaphragm 95. In the event the pressure-balancing chamber 76 should become fully charged and it is necessary to force additional actuator fluid from one or more of the remotely located valve actuators, the excessive actuating fluid may be bled from the system through the relief valve structure 88. After fluid pressure within the protective conduit 18 has been decreased, the pressure differential across the check valve 80 will cause the check valve to open thereby allowing pressurized fluid to flow from the pressure-balancing chamber 76 or from the return line 82 through the conduit 68 to the protective conduit 18. It is seen, therefore, that the return of actuator fluid is accomplished simply by reducing the fluid pressure within the protective conduit thereby allowing returned or accumulated fluid to flow back into the protective conduit. Return of accumulated fluid into the protective conduit is also enhanced by the hydrostatic head of the sea water or other medium in which the system is submerged since the sea water will act through the opening 94 on the flexible diaphragm 95 of the pressure-balancing chamber to displace actuating fluid. The accumulator 74 is maintained in full or substantially full status under full operational pressure at all times and is capable of providing a sufficient volume of pressurized fluid for limited actuation of the valve actuators. The check valve 78 prevents the flow of fluid from the accumulator to the conduit 68 as pressure is decreased within the conduit 68. It is possible, therefore, to achieve limited actuation of the valve actuators even though there is insufficient fluid pressure within the protective conduit 18 for such actuation.

It is to be borne in mind that the accumulator and pressure-balancing system 70 illustrated in FIG. 4 is intended merely for descriptive purposes and is not intended to limit the scope of the present invention. It would be clear to one skilled in the art that other accumulator systems might readily by employed within the spirit and scope of this invention.

Figure 5:
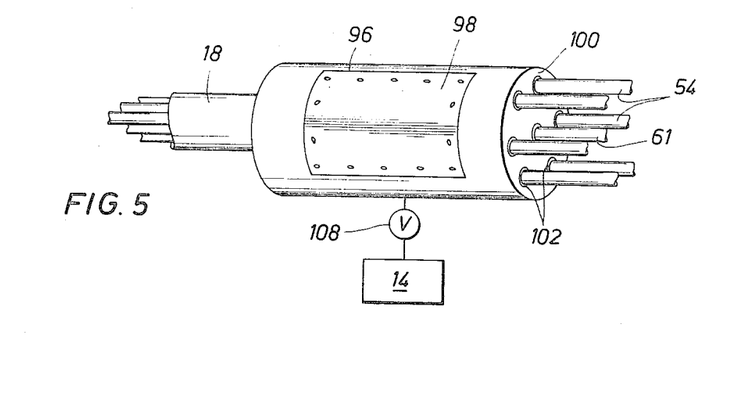
FIG. 5 is an isometric view illustrating pig and control line insertion structure of this invention.

Referring now to FIG. 5, the pig insertion housing 12 is in the form of a chamber of any desired configuration connected to the extremity of the protective conduit 18. The housing 12 is provided with an opening 96 of substantial dimension provided with a cover member 98, preferably of the quick disconnect type. The opening 96 is provided to allow personnel to gain access within the housing 12 for the purpose of connecting joints of conduit with the housing. With reference to FIGS. 5 and 6, the housing 12 is provided with an orifice plate 100 having a plurality of orifices 102 formed therein in order to allow conduit to pass through the orifice plate and into the housing 12. While the orifice plate 100 is shown as having a plurality of openings 102, it is to be understood that a single conduit opening may be provided in the event the control conduits 54 are to be provided with a single protective cover such as illustrated in FIGS. 3 and 4. Each of the orifices 102 is a adapted to receive a packing retainer 104 capable of maintaining an annular packing member 106 in proper position to establish sealing engagement with the outer surface of the control conduit extending therethrough. The packing and packing retainer may be segmented in order to allow removal and replacement thereof with conduit extending through the orifice plate and to allow conduit connections to pass through the orifice plate. As illustrated schematically in FIG. 5, the system is provided with a source 14 of fluid pressure capable of introducing pressurized fluid such as hydraulic fluid or pneumatic fluid into the pig insertion housing, under control of a valve 108. The control conduits 54 and a pig retrieval cable are inserted through the orifice plate openings 102 and connection of the conduits 54 is made with the pig 46. The closure member 98 is then secured about the opening 96 of the housing and fluid pressure is applied from the source 14 of fluid pressure in order to force the pig member 46 through the protective conduit 18, thereby drawing the control conduits 54 along with the pig structure. Simultaneously with the application of fluid pressure from the source 14 to one side of the pig structure, a vacuum may be communicated to the protective conduit on the other side of the pig structure in order to provide additional motive force for the locomotive pig structure. As illustrated in FIGS. 2, 3 and 4, a vacuum or suction conduit 110 extends through the terminal connector 20 and communicates a source of vacuum with the plug-receiving recess 36. A suitable hydraulic connector coupling 111 may be fixed to the conduit 110 in such manner as to allow a vacuum conduit to be extended to the level of the terminal connector and secured thereto. A vessel located above the terminal connector may provide the source of vacuum.

In order to facilitate retrieval of the locomotive pig and the control conduit structure, the operation may be reversed through the coupling 111 in order to allow a vessel located over the terminal connector structure 20 to introduce fluid pressure through the conduit 110 to the plug-receiving recess. Fluid pressure introduced in this manner and suction applied at the other extremity of the protective conduit will serve to aid the retrieval cable in moving the pig and control conduit structure through the protective conduit. Movement of the locomotive pig through the protective conduit may also be accomplished by applying fluid pressure to one side of the pig and venting the fluid on the other side of the pig, either through external vent structure or venting the fluid through the control conduits. Retrieval of the locomotive pig might be accomplished by pumping fluid through the control conduits to the opposite side of the locomotive pig, thereby forcing the pig to move in the retrieve direction thereof.

Figure 7:
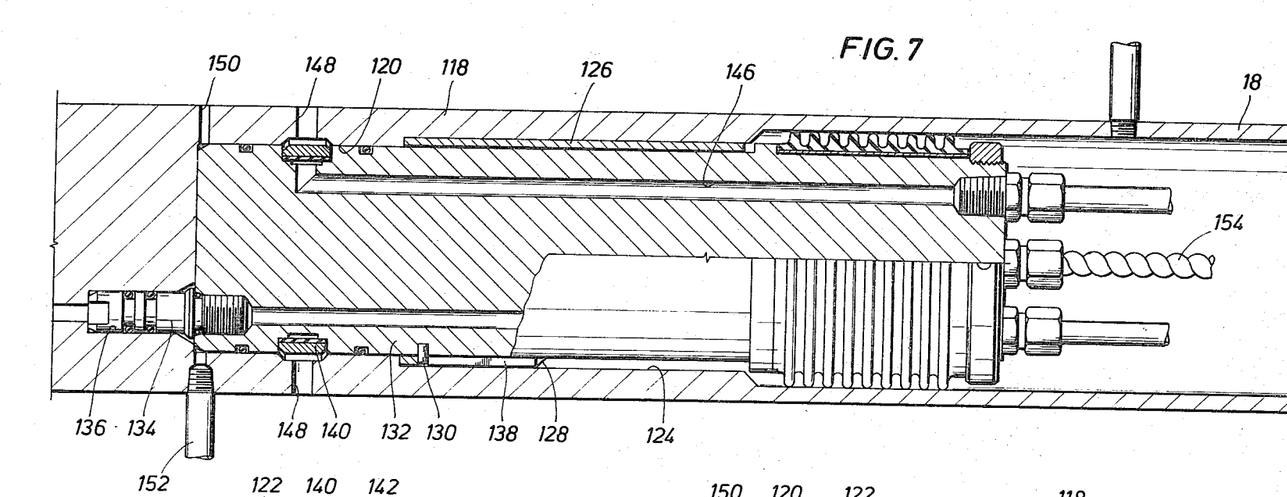
FIG. 7 is a sectional view illustrating connection structure and protective conduit structure of a modified embodiment of my invention and illustrating a modified locomotive pig disposed in fully seated but unlatched condition within the connection structure.
Figure 8:
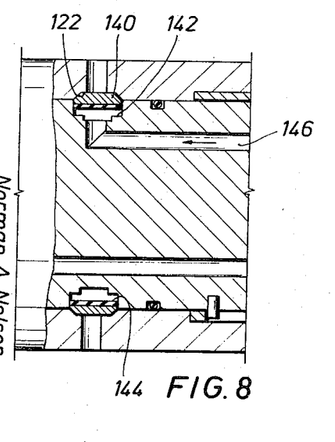
FIG. 8 is a fragmentary sectional view of the terminal connection structure and pig structure of FIG. 7 illustrating the latching mechanism thereof in the latched or operative condition.
Figure 9:
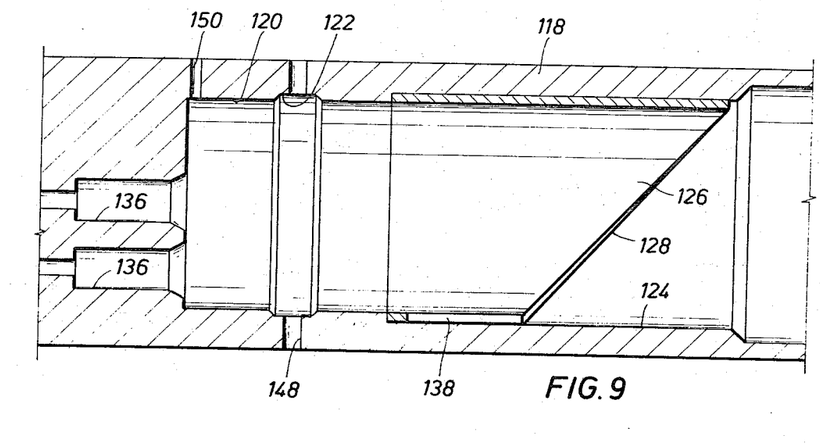
FIG. 9 is a sectional view illustrating the terminal connection structure and protective conduit structure of FIG. 7 and showing the pig orienting structure thereof in detail.

Referring now to FIGS. 7, 8 and 9, a modified embodiment of this invention is illustrated which includes a terminal connector portion 118 either formed integral with or connected to the protective conduit 18. The terminal connector portion 118 includes a plug-receiving recess 120 of generally cylindrical configuration having a locking recess 122 formed intermediate the extremities thereof. The inner wall of the pig-receiving recess is enlarged at 124 in order to receive a pig-orienting sleeve 126 therein. The sleeve 126 is provided with a tapered portion 128 serving a cam that is engaged by a pin member 130 carried by a locomotive pig member 132 and is operative to rotate the pig member in order to align appropriate fluid transfer connectors 134 with connector recesses 136 formed in the terminal connector portion 118. The sleeve 126 is also provided with the slot 138 extending parallel to the axis of the terminal connector 118 that cooperates with the pin 130 to allow linear movement of the pig member 132 after the pig has been properly oriented thereby allowing insertion of the connectors 134 into their respective recesses.

An expanding split sleeve latch 140 is retained within a latching recess 142 formed about the exterior periphery of the pig 132. A flexible sleeve 144 is interposed within the groove 142 behind the split sleeve latch 140 and is expanded by control pressure introduced through the latching control passage 146 thereby serving to force the split sleeve latch from the unexpanded condition illustrated in FIG. 7 to the expanded and latched condition illustrated in FIG. 8. The split sleeve member 140 is formed of spring material and upon reduction of fluid pressure within the latching control passage 146 will return to the unexpanded or FIG. 7 position thereof releasing the pig from the terminal connector. The latching groove formed in the terminal connector 118 is provided with tapered sidewalls which allow camming of the split sleeve latch 140 to its collapsed or FIG. 7 position in order to positively facilitate the releasing movement of the latch. The terminal connector 118 is provided with vents 148 that allow uninhibited movement of the split sleeve latch between the latched and unlatched positions thereof and is also provided with a vent 150 to allow full insertion of the locomotive pig member 132 without allowing the development of a pressure lock condition.

In order to assist in movement of the locomotive pig member 132, within the protective conduit 118, a source of vacuum or suction may be communicated from a vessel located above the terminal connector by a vacuum conduit 152 threadedly or otherwise received by the terminal connector. Likewise, the pig member 132 may be assisted in its removal by application of fluid pressure through the conduit 152 simultaneously with the application of a vacuum at the other extremity of the protective conduit 18 along with the retrieval of the pig member by the retrieval cable structure illustrated at 154 in FIG. 7.

The fluid circuitry of the terminal connector 118 will be communicated to appropriate pilot valve structure and an accumulator system such as is illustrated in FIG. 4 in order to achieve controlled actuation of various remotely located valve actuators or mechanical devices. Actuator fluid expelled from the valve actuators on the mechanical devices will be transmitted through the accumulator system and into the protective conduit in the same manner as illustrated above in regard to FIG. 4.

Figure 10:
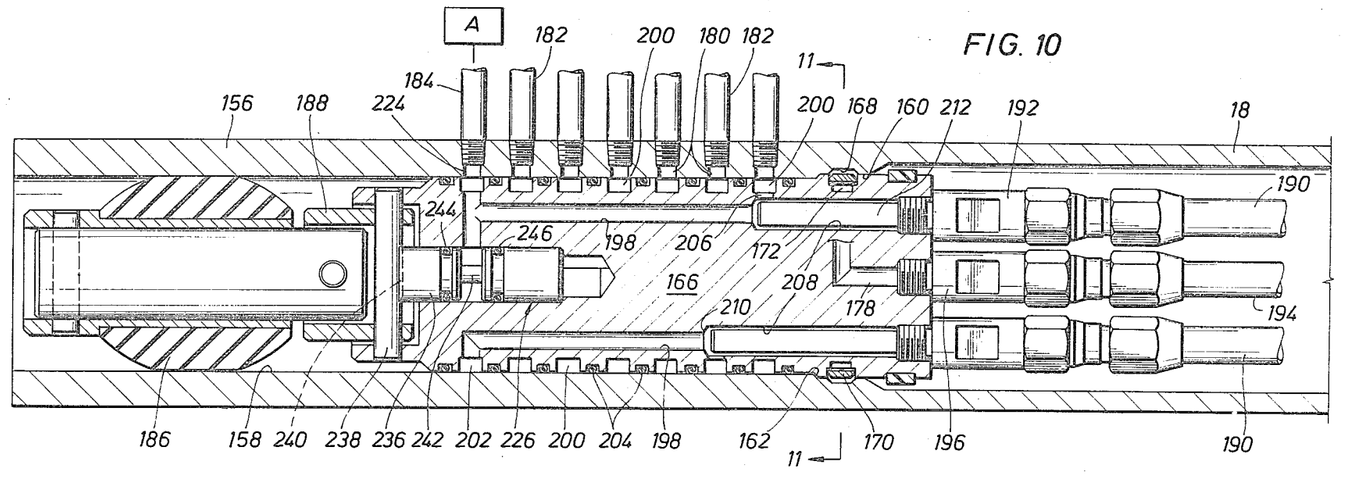
FIG. 10 is a sectional view of a further modified embodiment of my invention illustrating a connection structure and protective conduit structure provided with a modified locomotive pig being disposed in fully seated but unlatched condition within the protective structure.

Referring now to FIG. 10, a further modified embodiment of my invention involves a terminal connector 156 formed integral with or attached to the extremity of a protective conduit 18. The inner wall 158 of the terminal connector 156 is of substantially cylindrical configuration and is of smaller diameter than the inner wall of the protective conduit 18. An increased diameter cylindrical surface 160 is defined within the terminal connector 156 and cooperates with the cylindrical surface 158 to define an annular shoulder 162, that is engaged by an annular stop shoulder 164 formed on a locomotive pig 166 capable of being received within the terminal connector 156. The annular increased diameter portion 160 of the terminal connector is provided with an annular locking groove 168 that is disposed in registry with a split sleeve-type locking member 170 carried by the locomotive pig when the pig is fully inserted into the terminal connector.

The split sleeve locking member 170 is retained with an annular groove 172 formed in the surface 160 of the pig member 166 and is expanded to its locked condition within the locking recess 168 by a flexible diaphragm 174 disposed within the groove 172. Fluid pressure is introduced into the groove 172 through transverse passages 176 disposed in fluid communication with the latching fluid passage 178.

The terminal connector 156 is provided with a plurality of fluid supply ports 180 to which are connected a plurality of fluid supply conduits 182. Each of the fluid supply conduits is communicated directly to a remotely located valve actuator or other mechanical device in order to supply hydraulic or pneumatic fluid for operation thereof. A conduit 184 is threadedly secured to the terminal connector 156 and serves to establish fluid communication between the terminal connector and a pressure-balancing system illustrated schematically at A. The pressure-balancing system A is of the same general nature as is the pressure-balancing portion of the system illustrated in FIG. 4 and serves as a storage facility for fluid expelled from a deenergized valve actuator so that the valve actuator may be capable of quick movement to its deenergized position. The pressure-balancing system A will also include a pressure relief system such as that discussed above at 88 in FIG. 4 for the purpose of bleeding fluid into the medium surrounding the terminal connector in the event excessive pressures are encountered.

Figure 11:
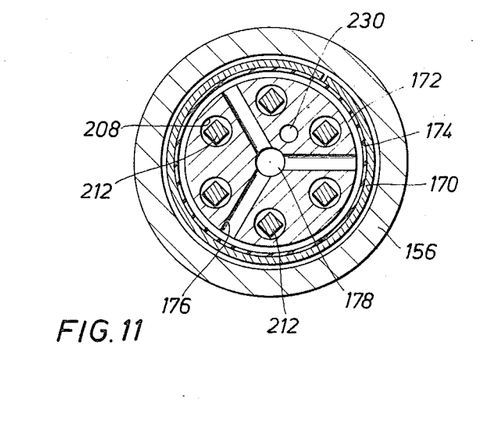
FIG. 11 is a sectional view taken along line 11—11 in FIG. 10 and illustrating the latching mechanism of the locomotive pig in detail.

The locomotive pig 166 is propelled within the protective conduit 18 by a piston member or swab 186 that is secured by a universal connection 188 to the forward end of the locomotive pig 166. The universal connection 188 allows the swab member 186 latitude of movement in all directions in order that the swab member may seek its best condition of sealing with the inner wall of the protective conduit as it moves therethrough and may seek a positive seal with the cylindrical surface 158 as the pig member moves into fully seated condition within the terminal connector 156. As the locomotive pig 166 is propelled through the protective conduit 118 by the application of pressurized fluid within the protective conduit, or by a combination of pressure application on one side of the pig and application of suction or vacuum on the other side of the pig in any desirable manner, a plurality of control conduits 190 are pulled through the protective conduit by the pig. Each of the control conduits is secured to an associated pilot valve assembly 192 that is in turn secured by threaded engagement in an appropriate threaded aperture formed in the pig structure. A locking control conduit 194 is secured to a connector fitting 196 threadedly received within an appropriate aperture within the pig structure. The locking control conduit 194 is pulled along with the pig 166 through the protective conduit 18 during installation thereof. Fluid under pressure from the locking control conduit 194 is transferred through the connector 196 into a locking control passage 178, the upper extremity of which is threaded to receive the connector 196. As illustrated in FIG. 11, pressurized fluid is transferred from the passage 178 to a plurality of transverse passages 176 and to the annular groove 172 behind the flexible latch actuating follower 174 in order to induce movement to the latch structure.

Figure 12:
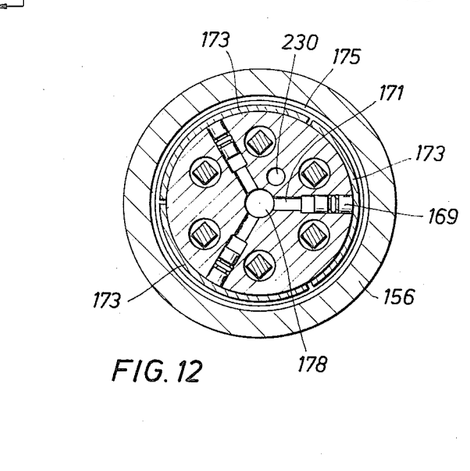
FIG. 12 is a sectional view of a modified latching mechanism designed for incorporation in the pig structure of FIG. 10.

As illustrated in FIG. 12, a plurality of pistons 169 may be disposed within radiating passages 171 from the central passage 178 in order to force latching segments 173 into the annular latching groove 168 of the terminal connector. The piston members 169 are actuated by fluid pressure from passage 178 and the radial passages 171 that is supplied through locking control conduit 194. In order to return the latching segments 173 to their inoperative or retracted position, a spring member 175 is disposed within an annular groove formed in the latching segments as shown in detail in FIG. 14. The spring member 175 may be composed of elastomeric material or any other suitable material that is capable of forcing the piston members inwardly to release the latching connection with the terminal connector. It is anticipated that the terminal connector device may be provided with locking segments actuated by piston members while the pig member is provided with a locking groove to receive the locking segments without departing from the spirit and scope of the instant invention.

For energization of remotely located valve actuators or mechanical devices, the locomotive pig member 166 is provided with a plurality of fluid supply passages 198 communicating with a plurality of annular grooves 200 formed exteriorly of the pig structure 166. The annular grooves 200 communicate with associated ones of the fluid supply conduits 182 in order to conduct pressurized actuating fluid from the passages 198 to the respective valve actuators intended for operation. The fluid supply passages 198 are also in fluid communication with an annular groove 202 formed exteriorly of the pig 166 and disposed in registry with the pressure-balancing conduit 184 when the pig structure is fully seated within its recess in the terminal connector. A plurality of sealing members, 204, which may be O-rings or the like, are received within annular grooves formed within the locomotive pig 166 in order to develop a fluid seal between the pig structure and the inner wall 158 of the terminal connector on either side of each of the annular grooves 200 and 202. The sealing members 204 assure channelling of actuating fluid to only the selected fluid supply conduit or pressure-balancing conduit.

Figure 14:
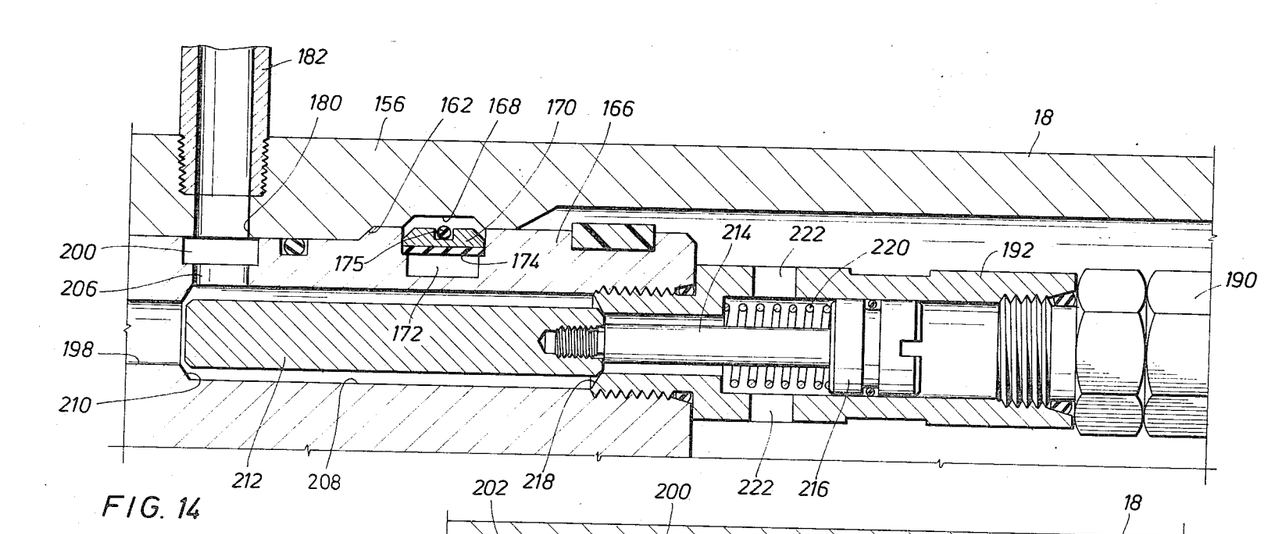
FIG. 14 is a fragmentary sectional view of the connection structure and pig structure of FIG. 10, illustrating the pilot valve structure thereof in detail.

Each of the fluid supply passages 198 is enlarged throughout a length sufficiently to extend from an associated pilot valve assembly to one of a plurality of transverse fluid supply passages 206, establishing fluid communication with an associated annular groove 200. The enlarged diameter portion 208 of the fluid supply passages 198 cooperates with the fluid supply passage to define seat members 210 that are engaged by a valve extension 212 in order to block the flow of fluid through the remainder of the passage 198. As shown in detail in FIG. 14, the valve extension 212 is secured to the valve-actuating stem 214 of a piston 216 movably disposed within the pilot valve assembly 192. The inner extremity of the pilot valve assembly 192 defines a tapered valve seat 218 that is engaged by the pilot valve 212 as it is biased to one extremity of its movement by a compression spring member 220 in order to prevent the flow of pressurized fluid into the fluid passage 198. As control pressure is applied through one of the conduits 190, the piston member 216 will be forced to the left as illustrated in FIG. 14, thereby compressing the spring 220 and causing the pilot valve 212 to move into sealing engagement with the valve seat 210. When this occurs, actuating fluid enters the pilot valve assembly through apertures 222 and is conducted into the enlarged portion 208 of the fluid supply passage 198. As illustrated in FIG. 11, the pilot valves 212 are generally rectangular in shape and cooperate with the cylindrical enlarged portion 208 of the supply passage to define passages allowing fluid to flow past the elongated pilot valves. When the pilot valve 212, illustrated in FIG. 14, has moved into sealing engagement with the seat 210, fluid is prevented from entering the pressure-balancing conduit 184 and is allowed to flow through the passages 206 and 180 to a selected fluid supply conduit 182.

When it is desired to deenergize an actuator, the fluid pressure within an associated control conduit 190 is reduced allowing the spring member 220 to force the pilot valve piston 216 to the position illustrated in FIGS. 10 and 14, thereby causing the pilot valve 212 to engage the seat 218 and to communicate fluid returning from the valve actuator to the fluid supply passage 198. It should be borne in mind that the pressure within the protective conduit 18 at this time will be at least equal to the pressure of the fluid expelled from the actuators thereby precluding any flow of actuating fluid through the fluid supply passage 198 directly into the protective conduit. However, flow is allowed through the fluid supply passage 198 and to the pressure-balancing conduit 184 by way of a transverse passage 224 communicating the fluid passage 198 with the annular groove 202 disposed in registry with the conduit 184, thereby providing a receptacle for the fluid expelled from the actuator in order to promote rapid deenergized actuation thereof.

Figure 13:
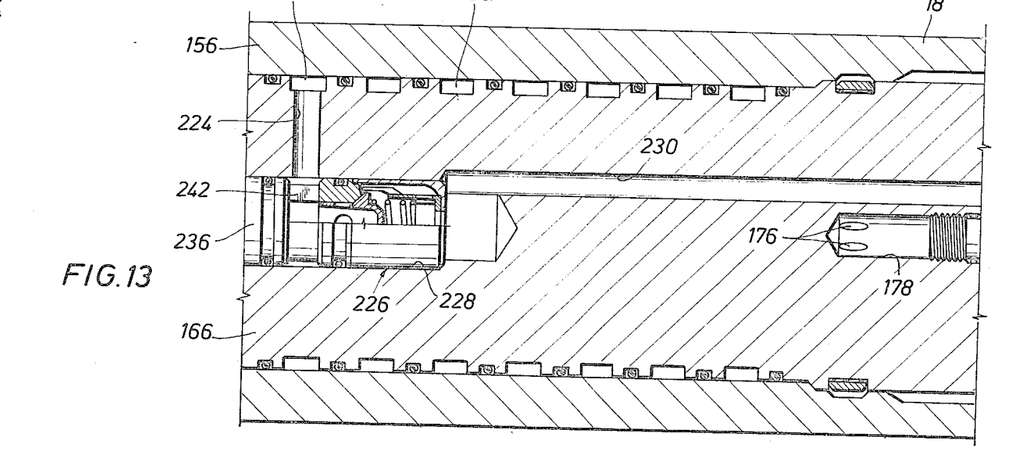
FIG. 13 is a fragmentary sectional view of the connection structure and pig structure of FIG. 10, illustrating the fluid return check valve structure thereof in detail.

The locomotive pig 166 is provided with a check valve assembly illustrated generally at 226 in FIG. 13 that is disposed within a generally cylindrical blind passage 228 formed centrally of the pig structure. The blind passage 228 is disposed in fluid communication with the protective conduit 18 by a relief passage 230 that is offset as shown in FIG. 11 in order to clear the latch-actuating passage 178. The check valve assembly 226 may be any one of a number of commercially acceptable check valve assemblies that are operative to allow fluid to be bled from the pressure-balancing conduit 184, through the transverse passage 224 and through the check valve assembly 226 to the relief passage 230. Fluid pressure applied in the reverse direction through the relief passage 230 will cause a spring biased check valve 232 within the check valve assembly to block the flow of fluid. In order to bleed fluid from the pressure-balancing chamber A through the conduit 184, it is necessary to reduce the fluid pressure within the pressure conduit 18 below the pressure level of the pressure-balancing chamber. This allows the pressure-balancing chamber to expel fluid through the check valve assembly into the protective conduit 18. The hydrostatic head of the sea water in which the system is submerged may act through an appropriate opening to aid in expelling fluid from the pressure-balancing system into the protective conduit 18. The check valve assembly 226 is maintained within the blind passage 228 by a valve retainer 236 disposed within the passage and retained in position by a pin 238 of the universal connection 188. A V-shaped groove 240, formed in the retainer 236, cooperates with the pin 238 to maintain the retainer 236 centered within the blind passage 228. Spacer members 242 provided on the retainer 236 maintain the check valve assembly 226 in spaced relation with the retainer thereby allowing fluid from the transverse passage 224 to enter the check valve assembly in unrestricted manner.

A pair of annular sealing members 244 and 246 are retained within annular grooves formed respectively in the retainer 236 and the check valve assembly 226 in order to prevent fluid from bypassing the retainer or check valve structures.

In operation the locomotive pig 166 is placed within the pig insertion housing 12 illustrated in FIG. 5 and the actuator control conduits 190 and the locking control conduits 194 are extended through the orifice plate 100 and are connected to the locomotive pig within the housing 12. The cover 98 is then secured to the housing and fluid pressure is applied from the source 14 against the piston or swab 186 which, through the universal connection 188, causes movement of the locomotive pig within the protective conduit 18. A suction or vacuum may be applied at the terminal connector of the protective conduit in order to assist in providing the motive force for the pig. The locomotive pig travels through the protective conduit 18 and pulls the actuator control conduits 190 and the locking control conduit 194 along with it until the shoulder 164 on the pig 166 engages the shoulder 162 in the terminal connector 156. When this occurs, the locomotive pig is fully seated within its recess within the terminal connector and the fluid-energized split sleeve latch or piston actuated latch is disposed in registry with the latching groove 168 in the terminal connector. Fluid pressure is then applied through the locking control conduit 194, thereby actuating the latching mechanism and securing the locomotive pig in assembly within the terminal connector. The locomotive pig, upon moving into fully seated position within the terminal connector establishes a plurality of spaced seals with the inner cylindrical wall 158 of the terminal connector. In this position, the annular fluid transfer groove 200 will be disposed in registry with an appropriate one of the fluid supply conduits 182 in order to conduct pressurized fluid to one of the valve actuators or mechanical devices selected for actuation. The pressure-balancing passage 224 is also disposed in registry with the conduit 184 in order to allow the pressure-balancing system A to receive fluid expelled from an actuator or mechanical device during the deenergized phase thereof.

When it is desired to energize a selected valve actuator, fluid pressure is applied through one of the control conduits 190 in order to bias the pilot-actuating pistons 216 thereof to a position seating the pilot valve 212 against the pilot valve seat 210 causing communication of fluid pressure from the protective conduit 18 through the pilot valve structure to the appropriate transverse fluid passage 206 and to a selected annular groove 200. Fluid under pressure for energizing the remotely located actuators is supplied through the protective conduit 18 exteriorly of the control conduits 190. When it is desired to return the remotely located actuator to its deenergized position, the fluid pressure within the control conduit 190 is decreased allowing the spring 220 to force the piston 216 in a direction moving the pilot valve 212 into engagement with seat 218 of the pilot valve assembly. The pilot valve 212 when so actuated simultaneously moves out of contact with the seat 210 allowing fluid communication between the fluid supply conduit 182 and the fluid supply passage 198 to the pressure-balancing passage 224. As long as the fluid pressure within the protective conduit 18 exceeds the pressure of fluid returning from a remotely located valve actuator, the expelled fluid will enter the pressure-balancing system A through the conduit 184. The pressure-balancing system A is of such volumetric dimension that a number of valve actuations may take place without necessitating bleeding of pressure back into the protective conduit 18 from the accumulator. As indicated above, the accumulator A is also provided with a pressure relief structure 88 to allow exhausting of excessive fluid from the accumulator into the medium surrounding the terminal connector in the event such becomes necessary. Bleeding of fluid from the accumulator system into the protective conduit 18 is accomplished simply by reducing the fluid pressure within the protective conduit below the pressure level of the accumulator, thereby allowing pressure differential to force fluid through the check valve structure 226 and through the passage 230 into the protective conduit.

From the foregoing, it is apparent that I have invented a fluid-energized control system for actuating the valves of subsea wellheads and other like mechanical devices that accomplishes both actuation and control of the mechanical devices through a single protective conduit structure. I have also provided a novel method of installing a plurality of control conduits, which method may be accomplished without necessitating diver assistance. A locomotive pig device is placed within the single protective conduit extending from the control facility to the remotely located wellhead assembly for which actuation is decided and is pumped down the protective conduit by fluid pressure. The locomotive pig is connected to a plurality of control conduits which are pulled through the protective conduit along with the locomotive pig structure. Upon reaching the fully seated position of the locomotive pig within a terminal connector disposed adjacent the wellhead to be actuated, a latching mechanism is actuated to secure the locomotive pig in assembly with the terminal connector.

I have also provided a novel method of actuating one or more remotely located fluid-actuated mechanical devices such as the valve actuators of a remotely located wellhead assembly that accomplishes actuating fluid transfer both to and from the actuators through a single conduit structure without adversely affecting the rapid operational characteristics of the valve actuators. A pressure-balancing system is provided to allow the valve actuators to expel actuator fluid upon moving to the deenergized position and the accumulator is operative to transmit accumulated fluid through the pig structure and into the protective conduit upon a subsequent reduction of fluid pressure within the protective conduit. Since control and actuation of remotely located valve actuators or mechanical devices can be achieved through a single protective conduit structure, it is logical that the resultant cost of a single conduit installation as opposed to multiple conduit installation greatly enhances the competitive nature of an installation constructed in accordance with the spirit and scope of my invention. My invention is, therefore, well adapted to attain all of the objects and advantages hereinabove set forth together with other advantages which will become obvious and inherent from a description of the apparatus itself.

It will be understood that certain combinations and subcombinations are of utility and may be employed without reference to other features and combinations. As many possible embodiments may be made of the invention without departing from the spirit or scope thereof, it is to be understood that all matters herein set forth or as illustrated in the accompanying drawings are to be interpreted as illustrative and not in a limiting sense.

I claim:

1. A fluid-energized control system for controlling at least one remotely located subsea wellhead mechanical device having fluid passage structure, said system comprising a protective conduit extending from a control facility above sea level to a position adjacent said mechanical device, terminal connector means defining an extremity of said protective conduit and having fluid passage means defined therein, means defining fluid communication between said connector means and said mechanical device, a locomotive pig having fluid passage means formed therein, said pig being disposed within said protective conduit and establishing a dynamic seal with the internal wall of said protective conduit control conduit means being connected at one extremity thereof to said pig and establishing fluid communication with said fluid passage means of said pig, a source of fluid pressure being disposed in fluid communication with the other extremity of said protective conduit and being capable of moving said pig through said protective conduit and thereby propelling said control conduit means through said protective conduit, said pig upon being moved to its terminal position within said protective conduit establishing fluid communication between said fluid passage means of said pig and the fluid passage means of said terminal connector means, means locking said pig in assembly with said terminal connector means, and a second source of fluid pressure connected to the other extremity of said control conduit means.

2. A fluid-energized control system according to claim 1, an actuating fluid supply passage being defined between said control conduit means and the internal wall of said protective conduit, fluid pressure for actuating said mechanical device being supplied through said actuating fluid supply passage, control valve means provided for controlling fluid communication between said actuating fluid supply passage and the fluid passage means of said pig, said control valve means being selectively opened or closed responsive to pressure changes within said control conduit means.

3. A fluid-energized control system according to claim 1, an actuating fluid supply passage being defined between said control conduit means and the internal wall of said protective conduit, accumulator means and pressure-balancing means being disposed in communication with said actuating fluid supply passage, means disposed adjacent said mechanical device and being disposed in fluid communication with the fluid circuitry of said mechanical device, said accumulator means receiving fluid from said actuating fluid supply passage in order to provide an ample supply of pressurized actuating fluid adjacent said mechanical device, said pressure-balancing means receiving fluid upon exhausting of said mechanical device in order to assure rapid actuation of said mechanical device, said pressure-balancing means bleeding fluid into said actuating fluid supply passage upon decrease of pressure within said source below the pressure level of said accumulator means.

4. A fluid-energized control system according to claim 1, said means locking said pig in assembly with said connector means comprising a locking groove formed within said connector means, movable fluid-actuated latch means carried by said pig, a latch control fluid passage within said pig supplying fluid to said latch means, a latching control conduit connected to said pig in communication with said latch control fluid passage and extending through said protective conduit to said control facility, fluid pressure supplied through said latching control conduit causing movement of said latch means into said locking groove.

5. A fluid-energized control system for controlling a plurality of remotely located fluid actuatable mechanical devices of a subsea wellhead, said system comprising a protective conduit extending from a control facility above sea level to a position adjacent said mechanical devices, a terminal connector defining an extremity of said protective conduit and having a pig receiving recess therein and having a plurality of fluid passages disposed therein in fluid communication with said pig-receiving recess, said protective conduit being connected at one extremity thereof to said terminal connector, a locomotive pig disposed within said protective conduit in dynamic sealed relation with the inner wall thereof, a plurality of fluid passages formed in said pig, a plurality of control conduits connected to said pig in fluid communication with the fluid passages formed in said pig, a source of fluid pressure being communicated to the other extremity of said protective conduit and being operative to impart movement to said locomotive pig thereby causing said control conduits to be drawn along with said pig through said protective conduit, said pig upon reaching its terminal position being received within said pig-receiving recess and establishing fluid communication between the fluid passages of said terminal connector and the fluid passages of said pig, means securing said pig within said pig-receiving recess, and means for supplying fluid pressure from said protective conduit to a selected mechanical device in response to fluid pressure in an associated one of said control conduits.

6. A fluid-energized control system according to claim 5, a plate forming a closure for the other extremity of said protective conduit said control conduits extending through said plate, said plate having means establishing a seal about each of said control conduits whereby said control conduits may be drawn through said plate and into the protective conduit by the locomotive pig.

7. A fluid-energized control system according to claim 5, said pig having a plurality of control valves one provided for each of said control conduits, said control conduits and said protective conduit cooperating to define an actuating fluid passage, said control valves controlling the supply of actuating fluid to said fluid passages of said mechanical devices.

8. A fluid-energized control system according to claim 5, a pressure-balancing circuit connected to said mechanical devices and also communicating with said operating fluid supply passage, said pressure-balancing circuit being charged with fluid upon deenergization of said mechanical devices in order to provide for quick deenergized actuation of said mechanical devices, said pressure-balancing circuit communicating with said operating fluid supply passage and bleeding fluid into said operating fluid supply passage upon decrease of fluid pressure below the pressure level of said operating fluid within said operating fluid supply passage.

9. A fluid-energized control system according to claim 8, said system having fluid return passage means communicating said pressure-balancing circuit to said source of fluid pressure through said protective conduit, check valve means permitting the flow of fluid from the pressure-balancing circuit to said protective conduit but preventing the flow of fluid from said protective conduit directly into said pressure-balancing circuit.

10. A method of connecting a plurality of control conduits between remotely located facilities, said method comprising the steps of laying a protective conduit between said facilities, placing a locomotive pig within one end of said protective conduit, attaching said control conduits to said pig, connecting said one end of said protective conduit to a source of pressurized fluid communicating pressurized fluid into said protective conduit thereby forcing said locomotive pig through said protective conduit to a terminal position and causing said control conduit to be pulled through said protective conduit by said locomotive pig, establishing fluid connection of each extremity of said control conduits with appropriate fluid receptacle at each of said facilities.

11. A method according to claim 10, said locomotive pig having fluid passage means formed therein one of said facilities having fluid passage structure adapted to receive said fluid passage means of said pig in fluid communication therewith, said method including the steps of; establishing fluid communication between said control conduits and said locomotive pig, moving said locomotive pig within said protective conduit to a position establishing fluid communication between said fluid passage structure at said one facility and said fluid passage means of said locomotive pig and locking said pig in immovable relation with said fluid passage structure of said one facility.

12. A method according to claim 10 and including the step of communicating a source of suction to the protective conduit on the opposite side of said locomotive pig simultaneously with communication of pressure to said protective conduit, whereby said suction and pressure act simultaneously to provide a motive force for movement of said locomotive pig within said protective conduit.

13. A method according to claim 10 and including the step of venting fluid from the protective conduit on the opposite side of said locomotive pig simultaneously with communication of pressure to said protective conduit whereby movement of said locomotive pig within said protective conduit will not be resisted by the presence of fluid within said protective conduit.

* * * * *